Aug. 17, 1937.  P. C. REGAN  2,090,357
REVERSE MOVEMENT STOP DEVICE
Filed Oct. 26, 1936
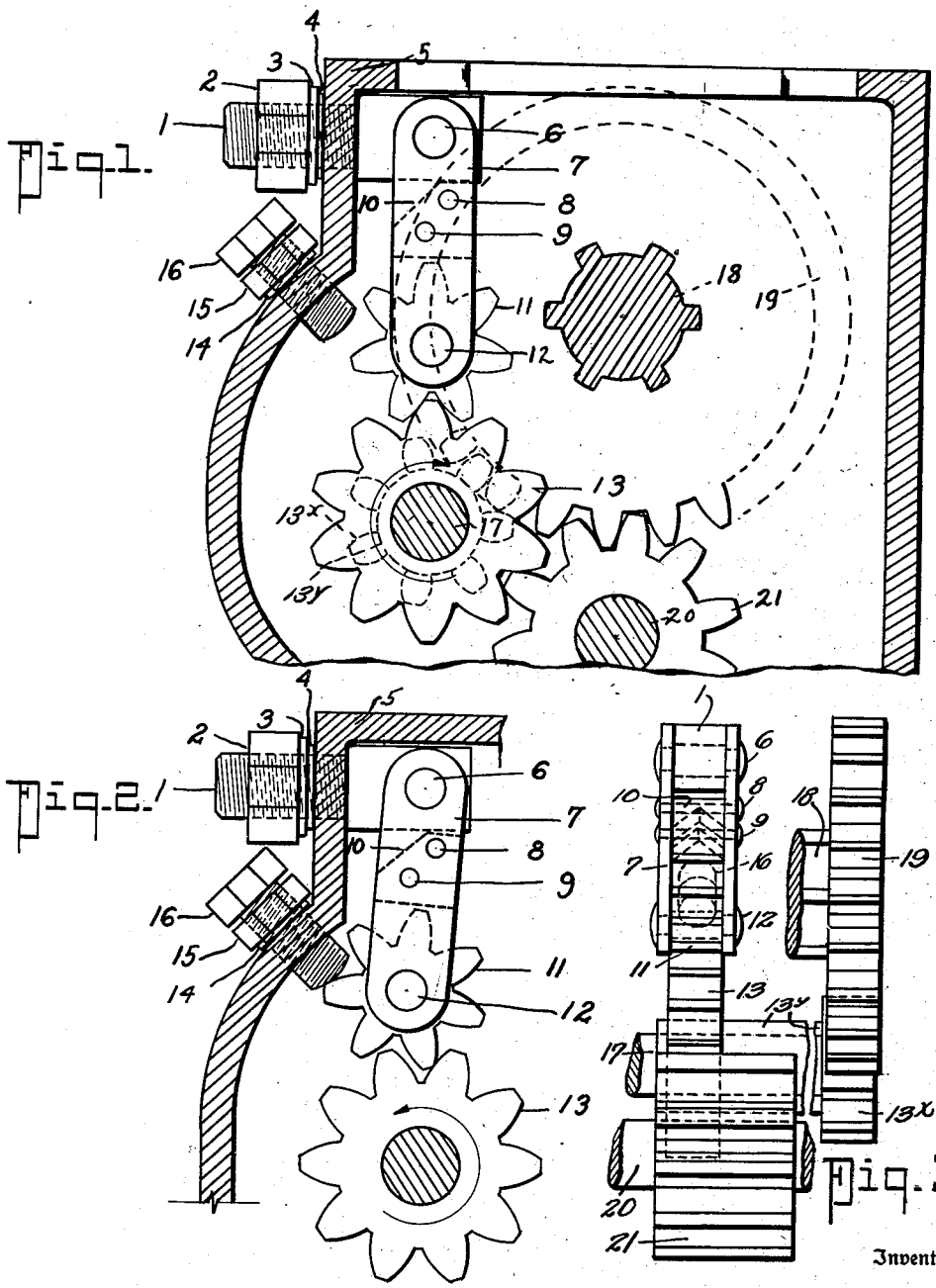
Inventor
Philip C. Regan
By Albert F. Dieterich
Attorney Patented Aug. 17, 1937

2,090,357

UNITED STATES PATENT OFFICE 2,090,357

REVERSE MOVEMENT STOP DEVICE

Philip C. Regan, Washington, D. C.

Application October 26, 1936, Serial No. 107,729

3 Claims. (Cl. 192—4)

My invention which relates to the art of motor vehicles, has more especially for its object to provide means to prevent the vehicle starting backward when the brakes of the vehicle are released and the foot is being shifted over to the accelerator in starting the vehicle forwardly. It is well known that in common practice, in starting a vehicle on a hill, the clutch is thrown out by the left foot, and the low speed gear is shifted into mesh while the brakes are held by the right foot. As soon as the vehicle can be put into motion the operator shifts his right foot from the brake pedal to the accelerator. It is during this interval that the car starts to slip backward, and it is an object of the invention to hold the car from slipping backward while shifting the foot from the brake pedal to the accelerator pedal.

Again, it is an object to provide means to hold the car from moving in the wrong direction while any speed gear is meshed, i. e., low, second or high, and the clutch is out of engagement, thus making my invention useful to stop the car against forward movement while on an incline and it is desired to back up (reverse gear in mesh).

It is also an object to provide means to lock the car (should the brakes slip) against movement (forwardly or backwardly, as the case may be) when the engine is not running, and the clutch is engaged, with a forward speed gear meshed, when the car is headed down grade, or reverse gear meshed when the car is headed up grade, thus taking the strain off the engine crank shaft.

Another and important object of the invention is to provide an attachment for the purpose which can be easily applied to practically all standard transmission mechanisms without removing the same from the car, and without expensive machine work thereon or addition thereto; to this end I apply my device to the idler gear of the transmission.

Again, it is an object to provide a device for the purposes stated which is of few parts, of rugged construction, is wholly automatic in its action and is inexpensive to manufacture and to install.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1 is a cross section of a transmission case with my invention applied, and in its normal or non-locking point, the low and reverse sliding gears on the main shaft, the low speed gear on the countershaft being indicated by dotted lines.

Figure 2 is a detail elevation of the device, the transmission case being shown in section and the device being in its operating position.

Figure 3 is a detail elevation of the parts shown in Figure 2, looking from right to left in said figure.

In the drawing, in which like numbers of reference indicate like parts in all the figures, 5 indicates the transmission case, 17 the idler shaft, 13 the idler shaft gear, 13$^x$ the idler gear (the gears 13 and 13$^x$ are both carried by the idler shaft 13$^y$ and turn together as one), 20 the countershaft, 21 the countershaft gear, 18 the main shaft, and 19 the low and reverse sliding gear. The view Figure 1 is taken looking rearwardly, i. e., toward the rear of the car.

My invention comprises a lug 1 having a threaded shank which passes through a suitably located drill hole in the casing 5 and is secured in place by washers 3 and 4 and a nut 2, one of the washers being a lock washer.

Secured to the lug 1 are two plates 7, pivoted on the lug by a pin 6 whose ends are upset or riveted over to hold the plates in place; at their lower ends the plates carry a similar pin 12 on which turns a gear or star wheel 11, a block 10 being secured between the plates 7 between the lug 1 and wheel 11 by rivets 8 and 9. The block 10 serves as a one-way stop to hold the plates 7 from swinging inwardly beyond a vertical position, while allowing a considerable swinging movement in the opposite or outward direction, laterally. The wheel 11 continuously meshes with the idler shaft gear 13, running freely when the idler gear is turning in its normal direction (see Figure 1), but engaging a suitable stop 16 as soon as the idler gear begins to turn backwardly (see Figure 2).

The stop 1 consists preferably of a screw bolt threaded into a suitably located tapped hole in the casing 5 and secured adjustably in place by a lock nut 15 and washer 14.

The pivotal center 6 of the swingably mounted wheel 11 preferably lies directly above the axis of the shaft 17 so that when hanging free, stop 10 will engage the head of lug 1; thus only a very slight backward movement of idler shaft gear 13 is necessary to bring wheel 11 into engagement with stop 16 and lock the idler gear and consequently the propeller shaft (not shown) through whatever gear is in mesh (low, intermediate, high or reverse).

I am aware that numerous back-stop devices have been proposed to stop a vehicle from rolling backward, but all such devices with which I am familiar are either too complicated, and expensive to manufacture, or require special additions to the transmission gearing itself or to the propeller shaft (such as ratchets, pawls, combination of ratchets and pawls, brakes, friction devices, etc.) and none utilize the idler gear as an active element in the combination, and none are adapted for application to the gear mechanism now in use without expensive machine work thereon or expensive additions thereto.

By utilizing the idler shaft gear, it is not necessary to change the design of the transmission in any way—all that is necessary to do is to drill two holes in the case 5, one for the shank of the stud 1, and the other for the stop screw 16 and tap the latter.

From the foregoing, taken in connection with the accompanying drawing, it is thought that the construction, operation and advantages of the invention will be clear to those skilled in the art to which it appertains.

While I have shown a preferred embodiment of the invention, I desire it understood that change in the details of construction may be made without departing from the spirit of the invention and the appended claims.

What I claim is:

1. As a new article of manufacture for attachment to motor vehicle transmission cases for purposes described, a lug having a head and a threaded shank with a nut thereon, an arm pendantly pivoted at one end to the head of said lug, a toothed wheel rotatably mounted in the other end of said arm, and means to limit the swinging movement of said arm in one direction and a stop screw for engagement by said wheel, at times, while the article is in use for the purposes described.

2. In power transmission mechanism wherein is provided an idler shaft gear; an automatically actuated device for preventing reverse rotation of said gear, said device comprising a fixed support separate from the shaft of said gear, a toothed wheel pendantly swingably mounted on said support and continuously engaging said gear, said wheel running free when said gear is turning in its normal direction, a fixedly located stop against which said wheel is brought into engagement on reverse rotation of said gear to hold said wheel and consequently said gear against rotation for purposes described, and means to adjust the position of said stop with regard to the path of movement of said wheel.

3. In power transmission mechanism wherein is provided an idler shaft gear; an automatically actuated device for preventing reverse rotation of said gear, said device comprising a lug having a head and a threaded shank with a nut thereon, an arm pendantly pivoted at one end to the head of said lug, a toothed wheel rotatably mounted in the other end of said arm, and means to limit the swinging movement of said arm in one direction and a stop screw for engagement by said wheel, at times, while the device is in use for the purposes described.

PHILIP C. REGAN.